United States Patent
Jin

(10) Patent No.: US 9,989,823 B2
(45) Date of Patent: Jun. 5, 2018

(54) ARRAY SUBSTRATE AND DISPLAY PANEL

(71) Applicants: Shanghai AVIC OPTO Electronics Co., Ltd., Shanghai (CN); Tianma Micro-Electronics Co., Ltd., Shenzhen (CN)

(72) Inventor: Huijun Jin, Shanghai (CN)

(73) Assignees: SHANGHAI AVIC OPTO ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days. days.

(21) Appl. No.: 15/484,306

(22) Filed: Apr. 11, 2017

(65) Prior Publication Data

US 2017/0219897 A1 Aug. 3, 2017

(30) Foreign Application Priority Data

Oct. 28, 2016 (CN) .......................... 2016 1 0970860

(51) Int. Cl.
*G02F 1/1362* (2006.01)

(52) U.S. Cl.
CPC ............. *G02F 1/1362* (2013.01); *G02F 2001/136222* (2013.01); *G02F 2201/52* (2013.01)

(58) Field of Classification Search
None
See application file for complete search history.

(56) References Cited

U.S. PATENT DOCUMENTS

| 5,844,358 | A | 12/1998 | Uemura et al. | |
|---|---|---|---|---|
| 2004/0046725 | A1* | 3/2004 | Lee | G09G 3/3607 345/88 |
| 2008/0068537 | A1* | 3/2008 | Lee | G02F 1/136209 349/106 |
| 2008/0239223 | A1* | 10/2008 | Fujita | G02F 1/134363 349/138 |
| 2008/0316398 | A1* | 12/2008 | Woo | G02F 1/1323 349/110 |
| 2009/0141221 | A1* | 6/2009 | Taguchi | G02F 1/133512 349/109 |
| 2010/0238389 | A1* | 9/2010 | Chan | G02F 1/133514 349/107 |

(Continued)

FOREIGN PATENT DOCUMENTS

CN 105319760 A 2/2016

*Primary Examiner* — Dennis Y Kim
(74) *Attorney, Agent, or Firm* — Anova Law Group, PLLC

(57) ABSTRACT

An array substrate and a display panel are provided. The array substrate includes a plurality of sub-pixels defined by a plurality of scanning lines and a plurality of data lines, and a color filter layer including a plurality of color blockers in a plurality of colors. The plurality of sub-pixels is arranged in a matrix and includes first sub-pixels, second sub-pixels, third sub-pixels, and fourth sub-pixels configured to display different colors. The first sub-pixels, the second sub-pixels, the third sub-pixels, and the fourth sub-pixels each includes an aperture region, and a non-aperture region. A length-to-width aspect, ratio of the plurality of sub-pixels is greater than 2:1. An aperture region of the fourth sub-pixel is smaller than an aperture region of any one of the first sub-pixel, the second sub-pixel, and the third sub-pixel.

20 Claims, 11 Drawing Sheets

(56) References Cited

U.S. PATENT DOCUMENTS

| | | | |
|---|---|---|---|
| 2010/0289733 A1* | 11/2010 | Kim | G02F 1/136286 |
| | | | 345/92 |
| 2011/0234949 A1* | 9/2011 | Matsui | G02F 1/133512 |
| | | | 349/106 |
| 2012/0319183 A1* | 12/2012 | Yamazaki | H01L 29/7782 |
| | | | 257/288 |
| 2014/0063421 A1* | 3/2014 | You | G02F 1/1335 |
| | | | 349/106 |
| 2015/0060858 A1* | 3/2015 | Funahashi | H01L 27/124 |
| | | | 257/59 |
| 2016/0178981 A1* | 6/2016 | Lee | G02F 1/136213 |
| | | | 257/71 |
| 2016/0231626 A1* | 8/2016 | Kodera | G02F 1/133711 |
| 2016/0363821 A1* | 12/2016 | Lee | G02F 1/134309 |
| 2017/0146869 A1* | 5/2017 | Hirosawa | G02F 1/133512 |
| 2017/0162099 A1* | 6/2017 | Jin | G09G 3/2003 |

\* cited by examiner

: R  : G  : B  : W

: Overlapping portion of the color filters

ARRAY SUBSTRATE AND DISPLAY PANEL

CROSS-REFERENCES TO RELATED APPLICATIONS

This application claims priority of Chinese Patent Application No. 201610970860.7, filed on Oct. 28, 2016, the entire contents of which are hereby incorporated by reference.

FIELD OF THE INVENTION

The present disclosure generally relates to the field of display technology and, more particularly, relates to an array substrate and display panel.

BACKGROUND

With the development of optical technologies and semiconductor technologies, flat-panel display devices, such as liquid crystal display (LCD) devices and organic light emitting diode display (OLED) devices, have been widely applied to various kinds of electronic products. Characteristics of a flat-panel display device include a thinner and lighter body shape, a lower cost and power consumption, a faster response rate, a better color purity and brightness, and a higher contrast, etc.

Currently, as the dimension and resolution of the display devices are improved constantly, the power consumption of the display devices also increases, and how to effectively reduce the power consumption of the display devices has been a serious issue. Different from the traditional standard red-green-blue (RGB) display device, the standard white-red-green-blue (WRGB) display device not only improves the brightness of the display device, but also effectively reduces the power consumption of the display device, thus it is drawing increasing attention.

FIG. 1 illustrates a schematic view of an existing display panel 100. As shown in FIG. 1, the existing display panel 100 may comprise sob-pixels of four colors including a white or yellow color in addition to the three primary colors of RGB. By adding the white (W) sub-pixels or yellow (Y) sub-pixels into the traditional RGB sub-pixel arrangement with the red (R) sub-pixels, the green (G) sub-pixels, and the blue (B) sub-pixels images may be formed using corresponding sub-pixel rendering techniques.

Such design using four color sub-pixels may implement a higher resolution and a higher light transmittance, because the backlight may traverse the white (W) sub-pixels unblocked by the densely-arranged red (R) sub-pixels, green (G) sub-pixels, and blue (B) sub-pixels. Accordingly, the transmittance and brightness of a display panel 100 may be increased.

However, in existing technologies, the areas of the four color sub-pixels 110 on the display panel 100 are often the same, the areas of aperture regions 112 of the four color sub-pixels 110 are the same, and the areas of non-aperture regions 111 are also the same. Thus, the four color sub-pixels 110 often have the same aperture ratio.

According to the present disclosure, in practical applications of the display panel 100 having four color sub-pixels 110, the brightness of the white (W) sub-pixels needed for the display of the array substrate 100 is often around half of the maximum brightness. Accordingly, the issue of excessive brightness may exist in the display panel 100. Further, when the display panel 100 having four color sub-pixels 110 displays a single-color image (e.g., a red image, a green image, or a blue image), because the aperture ratio of single-color (R/G/B) sub-pixels on the array substrate 100 having-four color sub-pixels 110 is only ¾ of the display panel having three color sub-pixels, the issue of a relatively low brightness may exist.

Meanwhile, when the area of the aperture region of the sub-pixels is relatively large, the black matrix (BM) is correspondingly configured to be thinner, and the alignment accuracy becomes a high weight factor that affects the aperture ratio. When the alignment accuracy is relatively poor, the black matrix may partially shield the aperture region of the sub-pixels, thereby reducing the aperture ratio of the sub-pixels. Accordingly, the light transmittance of the display panel is reduced.

The disclosed array substrate and display panel are directed to solving at least partial problems set forth above and other problems.

BRIEF SUMMARY OF THE DISCLOSURE

One aspect of the present disclosure provides an array substrate. The array substrate includes a plurality of sub-pixels defined by a plurality of scanning lines and a plurality of data lines, and a color filter layer including a plurality of color blockers in a plurality of colors. The plurality of sub-pixels is arranged in a matrix and includes first sub-pixels, second sub-pixels, third sub-pixels, and fourth sub-pixels configured to display different colors. The first sub-pixels, the second sub-pixels, the third sub-pixels, and the fourth, sub-pixels each includes an aperture region and a non-aperture region. A length-to-width aspect ratio of the plurality of sub-pixels is greater than 2:1. An aperture region of the fourth, sub-pixel is smaller than an aperture region of any one of the first sub-pixel, the second sub-pixel, and the third sub-pixel.

Another aspect of the present disclosure provides a display panel. The display panel includes an array substrate, a counter arranged opposite to the array substrate, and a liquid crystal layer sandwiched between the array substrate and the counter substrate. The an array substrate includes a plurality of sub-pixels defined by a plurality of scanning lines and a plurality of data lines, and a color filter layer including a plurality of color blockers in a plurality of colors, further, the plurality of sub-pixels is arranged in a matrix and includes first sub-pixels, second sub-pixels, third sub-pixels, and fourth sub-pixels configured to display different colors. The first sub-pixels, the second sub-pixels, the third sub-pixels, and the fourth sub-pixels each includes an aperture region and a non-aperture region. A length-to-width ratio of the plurality of sub-pixels is greater than 2:1. An aperture region of the fourth sub-pixel is smaller than an aperture region of any one of the first sub-pixel the second sub-pixel, and the third sub-pixel.

Other aspects of the present disclosure can be understood by those skilled in the art in light of the description, the claims, and the drawings of the present disclosure.

BRIEF DESCRIPTION OF THE DRAWINGS

Other features, goals and ad vantages of the present disclosure will become more apparent from a reading of the following detailed description of non-limiting embodiments with reference to the accompanying drawings.

DETAILED DESCRIPTION

Figure 1:
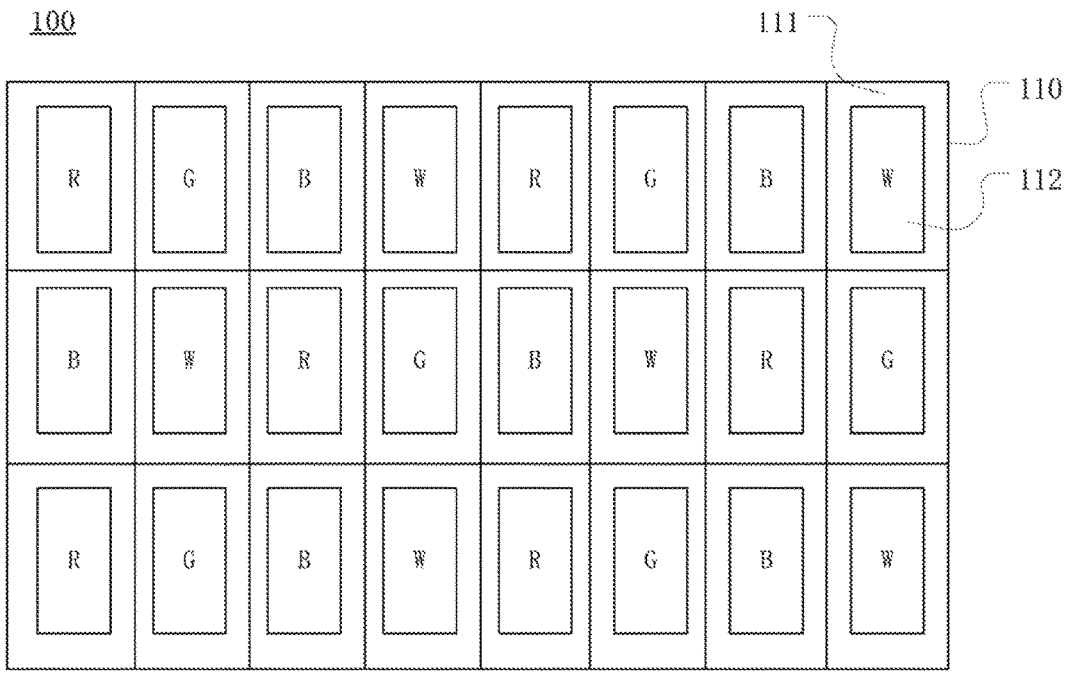
FIG. 1 illustrates a schematic view of an existing display panel.

Exemplary embodiments will now be described more fully hereinafter with reference to the accompanying drawings. However, exemplary embodiments may be embodied in various forms and should not be construed as limited to the embodiments set forth herein. Rather, these embodiments are provided so that the present disclosure will be described, and the scope of the disclosure can be understood to those skilled in the art. In the drawings, dimensions and shaped may be exaggerated, distorted, or simplified for clarity. Like reference numerals in the drawings may denote like elements, and thus their description may be omitted.

In addition, the described features, structures, or steps may be combined in one or more embodiments in any suitable manner. In the following description, numerous specific details are provided for understanding of embodiments of the present disclosure. Those skilled in the relevant art will recognize, however, that the embodiments of the present disclosure can be practiced without one or more of the specific details, or with other methods, steps, structures, etc.

The present disclosure provides an array substrate and a display panel. The array substrate includes a plurality of sub-pixels defined by a plurality of scanning lines and a plurality of data lines. The plurality of sub-pixels is arranged in a matrix, and includes first sub-pixels, second sub-pixels, third sub-pixels and fourth sub-pixels configured to display different colors. The first, sub-pixels, the second sub-pixels, the third sub-pixels, and the fourth sub-pixels each includes an aperture region and a non-aperture region. The length-to-width aspect ratio (hereinafter referred to as "aspect ratio") of each sub-pixel is higher than 2:1. The aperture region of the fourth sub-pixels is smaller than the aperture region of any one of the first sub-pixels, the second sub-pixels and the third sub-pixels. The array substrate further includes a color filter layer comprising a plurality of color blockers having a plurality of colors.

Figure 2:
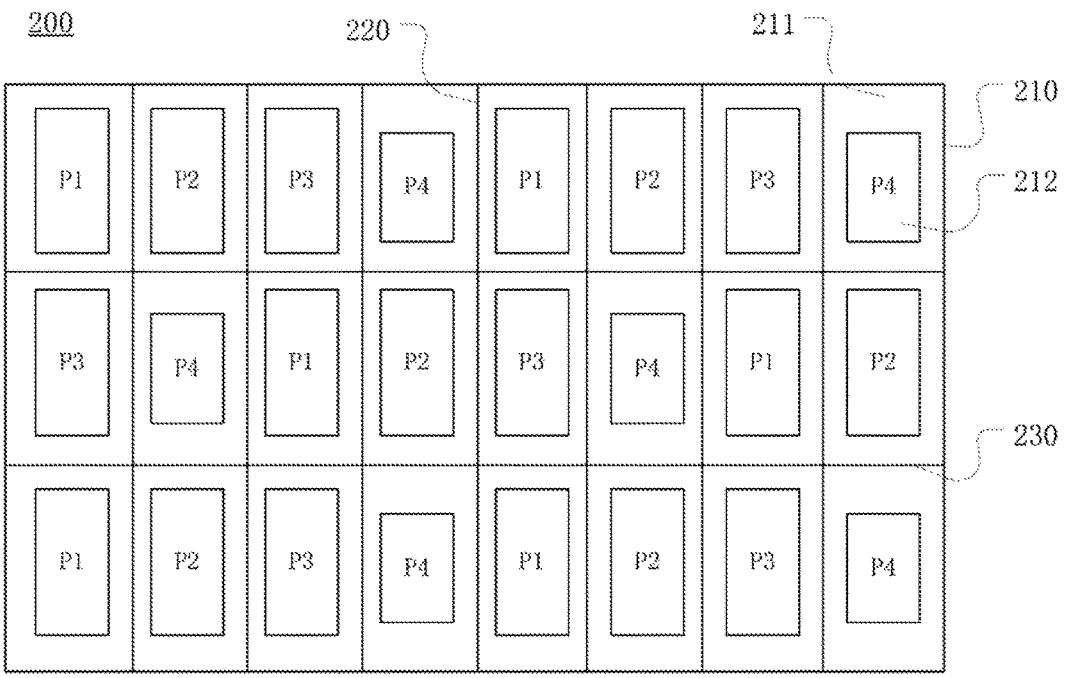
FIG. 2 illustrates a schematic view of an exemplary array substrate according to embodiments of the present disclosure.

FIG. 2 illustrates a schematic view of an exemplary array substrate according to embodiments of the present disclosure. As shown in FIG. 2, an array substrate 200 may include a plurality of sub-pixels 210 defined by a plurality of scanning lines 230 and a plurality of data lines 220. The plurality of sub-pixels 210 may be arranged in a matrix of rows and columns. The plurality of sub-pixels 210 may further include first sub-pixels P1, second sub-pixels P2, third sub-pixels P3, and fourth sub-pixels P4 configured to display different colors.

Further, the sub-pixels 210 may be stripe-shaped and the aspect ratio of each sub-pixel 210 may be greater than 2:1. In some embodiments, the aspect ratio of each sub-pixel 210 may be 3:1. The direction of the width of each sub-pixel 210 may be defined to be an extension direction of the scanning lines 230 from left to right on the array substrate (row direction), and the direction length of each sub-pixel 210 may be defined to be an extension direction of the data lines 220 from top to bottom (column direction).

In some embodiments, the first sub-pixels P1, the second sub-pixels P2, and the third sub-pixels P3 may each be one type of the red sub-pixels, green sub-pixels, and blue sub-pixels that are different from each other, further, in some embodiments, the fourth sub-pixels P4 may be white sub-pixels or yellow sub-pixels.

In one embodiment, as shown in FIG. 2, among the plurality of sub-pixels 210 arranged in a matrix of rows and columns, the fourth sub-pixels P4 may be arranged alternatingly in the row direction and the column direction of the matrix. That is, the fourth sub-pixels P4 are not adjacent to each other in both the row direction and the column direction of the matrix. More specifically, in the row direction and the column direction, one or a plurality of sub-pixels other than the fourth sub-pixels P4 may be disposed between two fourth sob-pixels P4 nearest to each other.

Further, as shown in FIG. 2, along the row direction of the matrix, the plurality of sub-pixels 210 arranged in a matrix shows a periodic arrangement of the first sub-pixels P1, the second sub-pixels P2, fee third sub-pixels P3, and the fourth sub-pixels P4 without continuous repeat. Two adjacent rows of sub-pixels 210 are arranged in a staggered manner. That is, two identical sub-pixels respectively arranged in two adjacent rows are staggered with respect to each other by two sub-pixels. For example, as a first sub-pixel P1 is disposed at a first position counting from the left to the right in the first row, another first sub-pixel P1 in the second row nearest to the first sub-pixel P1 in the first row is disposed at a third position counting from the left to the right. That is, the first sub-pixel P1 in the first row may align with the third sub-pixel P3 in the second row.

Further, each sub-pixel in a certain row of sub-pixels may align with an identical sub-pixel in an alternating row along the column direction, for example, the first sub-pixel P1 in the first row may align with the first sub-pixel P1 in the third row. FIG. 2 only illustrates an exemplary arrangement manner of sub-pixels according to the present disclosure. The number of each type of sub-pixels, the number of rows or columns, and the shape of sub-pixels are not limited thereto. Those skilled in the art may implement more different arrangement manners of sub-pixels, which is not repeatedly described herein.

Further, in one embodiment, as shown in FIG. 2, the first sub-pixels P1, the second sub-pixels P2, the third, sub-pixels P3, and the fourth sub-pixels P4 may each include an aperture region 212 and a non-aperture region 211. The area of the aperture region 212 of the fourth sub-pixel P4 may be smaller than the area of the aperture region of any one of the first sub-pixels P1, the second sub-pixels P2, and the third sub-pixels P3. That is, the area of the aperture region 212 of the fourth sub-pixel P4 may be smaller than the area of the aperture regions 212 of other sub-pixels. By configuring the area of the aperture region 212 of the fourth sub-pixels P4 to be smaller than the area of the aperture regions 212 of other sub-pixels, the issue where the fourth sub-pixels P4 shows excessive brightness may be solved.

In one embodiment, the aperture regions of the first sub-pixels P1, the second sub-pixels P2, and the third sub-pixels P3 may, for example, be the same. Further, in some embodiments, the aperture region of the fourth sub-pixels P4 may be greater than or equal to one third of the average aperture region of the first sub-pixels P1, the second sub-pixels P2, and the third sub-pixels P3. Accordingly, when each sub-pixel is rendered during imaging, a relatively high resolution may be obtained.

Further, a plurality of sub-pixels 210 may form a plurality of pixel groups. Each pixel group may include four sub-pixels 210. In particular, one of the tour sub-pixels 210 in each pixel group may be the fourth sub-pixel P4. In some embodiments, each pixel group may include one first sub-pixel P1, one second sub-pixel P2, one third sub-pixel P3, and one fourth sub-pixel P4. In some other embodiments, each pixel group may include one first sub-pixel P1 (or, one third sub-pixel P3), two second sub-pixels P2, and one fourth sub-pixel P4.

In some embodiments, each pixel group may further include at least one display unit. The at least one display unit in each pixel group is located in the non-aperture region 211 of the fourth sub-pixel P4. The display unit may be a thin-film transistor, a pixel electrode through-hole, a data line extraction hole, or one or a plurality of support columns (also known as photo spacers, spacer support, space columns, or spacers). The pixel electrode through-hole may be an electrical connecting structure between the pixel electrode of the sub-pixel and the drain electrode of the thin film transistor. The source electrode of the thin film transistor is electrically connected to one data line via the data line extraction hole.

Hereinafter, a situation where each pixel group includes four thin film transistors or each pixel group includes one support column is described, respectively, for illustrative purposes.

Instead of configuring the display units in the aperture region 211 of the first sub-pixel P1, the second sub-pixel P2, and the third sub-pixel P3, at least one display unit of each pixel group is configured in the non-aperture region 211 of the fourth sub-pixel P4. Accordingly, the area of the aperture region 212 of other sub-pixels may be increased, thereby increasing the aperture ratio of other sub-pixels. When the array substrate 200 displays a single color (the color of the first sub-pixels P1, the color of the second sub-pixels P2, or the color of the third sub-pixels P3), the display issue regarding a relatively low brightness may be alleviated.

Figure 3:
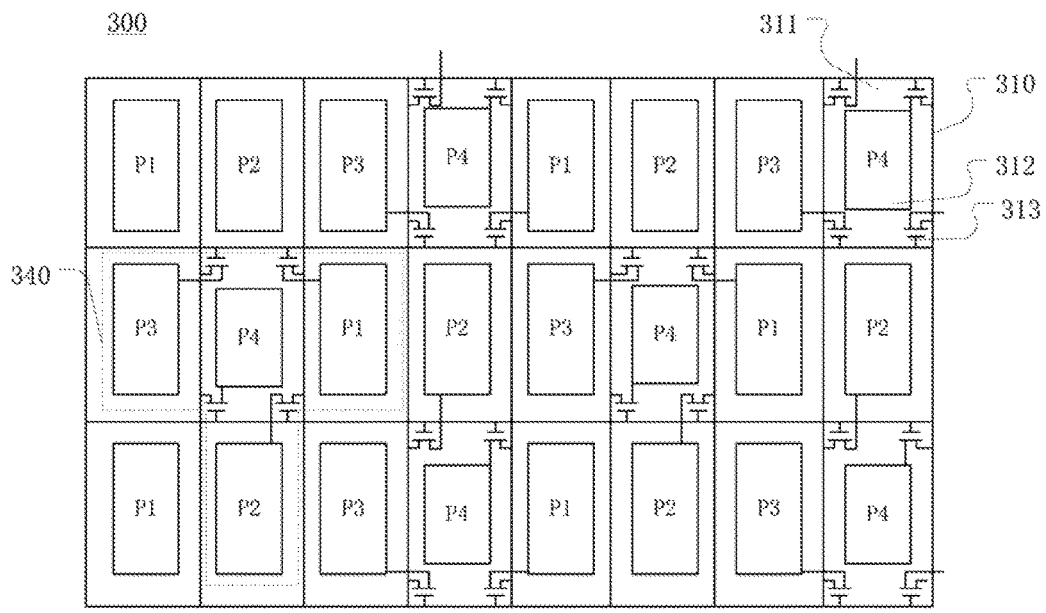
FIG. 3 illustrates a schematic view of another exemplary array substrate according to embodiments of the present disclosure.

The specific configuration of the display unit(s) is now illustrated hereinafter with reference to embodiments of the present disclosure. FIG. 3 illustrates a schematic view of another exemplary array substrate according to embodiments of the present disclosure. As shown in FIG. 3, an array substrate 300 has a similar structure as the array substrate 200 illustrated in FIG. 2.

That is, the array substrate. 300 may include a plurality of sub-pixels 310 defined by a plurality of scanning lines and a plurality of data lines. The plurality of sub-pixels 310 may be arranged in a matrix of rows and columns and further include the first sub-pixels P1, the second sub-pixels P2, the third sub-pixels P3, and the fourth sub-pixels P4 configured to display different colors. Each sub-pixel 310 may include an aperture region 312 and a non-aperture region 311.

Further, using a pixel group 340 as an example, the pixel group 340 may include four sub-pixels 310: one first sub-pixel P1, one second sub-pixel P2, one third sub-pixel P3, and one fourth sub-pixel P4. Each sub-pixel 310 may include a pixel electrode. In the pixel group 340, the four sub-pixels 310 may be arranged into a shape of "T", and the first, sub-pixel P1, the second sub-pixel P2, and the third sub-pixel P3 may be located adjacent to the fourth sub-pixel P4, respectively.

The pixel group 340 may further include four display units 313 disposed in the non-aperture region 311 of the fourth sub-pixel P4. The display unit 313 may be a thin film transistor. Each thin film transistor includes a gate electrode, a source electrode, and a drain electrode. The drain electrodes of the four thin film transistors 313 may be electrically connected to the pixel electrodes of the four sub-pixels 310 in the pixel group 340, respectively.

In one embodiment, as shown in FIG. 3, the gate electrode and the source electrode included in each of the four thin film transistors 313 in the pixel group 340 may be connected to different combinations of one scanning line and one data line. The drain electrodes of the four thin film transistors 313 in the pixel group 340 may be connected respectively to a pixel electrode of the fourth sub-pixel P4, pixel electrodes of two sub-pixels (e.g., P3 and P1) adjacent to the fourth sub-pixel P4 along the row direction of the matrix, and a pixel electrode of a sub-pixel (e.g., P2) adjacent to the fourth sub-pixel P4 long the column direction of the matrix. Accordingly, the four thin film transistors 313 in the pixel group 340 may correspond to the four sub-pixels 310 in the pixel group 340, respectively, and the four sub-pixels 310 in the pixel group 340 may therefore display a "T" shape.

For ease of clarification, FIG. 3 only illustrates electric connection of the thin film transistors 313 in the pixel group 340. Those skilled in the art may implement arrangement of sub-pixels 310 and electric connection of thin film transistors 313 in other pixel groups according to the description of the pixel group 340. For example, referring to FIG. 3, the four sub-pixels 310 in other pixel groups may be arranged into a "T" shape, or a reversed "T" shape, and the electric connection of the four thin film transistors 313 may be similar to that in the pixel group 340, which is not repeatedly described herein.

In some other embodiments, the gate electrode and the source electrode included in each of the four thin film transistors 313 in the pixel group 340 may be connected to a different combination of one scanning line and one data line. The drain electrodes of the four thin film transistors 313 in the pixel group 340 may be respectively connected to a pixel electrode of the fourth sub-pixel P4, a pixel electrode of a sub-pixel (e.g., P2) adjacent to the fourth sub-pixel P4 along the column direction of the matrix, a pixel electrode of a sub-pixel (e.g., P3) adjacent to the fourth sub-pixel P4 along the row direction of the matrix, and a pixel electrode of a sub-pixel, (e.g., P1) both adjacent to the two sub-pixels other than the fourth sub-pixel P4 (e.g., P2 and P3). Accordingly, the drain electrodes of the four thin film transistors 313 may correspond to the four sub-pixels 310 in the pixel group 340, and the four sub-pixels in the pixel group 340 may be thus arranged in a rectangular shape.

Referring to FIG. 3, instead of occupying the aperture region of the first sub-pixel P1, the second sub-pixel P2, and the third sub-pixel P3, the four thin film transistors 313 electrically connected to the four sub-pixels in a same pixel group may be disposed in the non-aperture region 311 of the fourth sub-pixel P4. Accordingly, the area of the aperture region 312 of the sub-pixels other than the fourth sub-pixels P4 may be increased, thereby increasing the aperture ratio of the sub-pixels other than the fourth sub-pixels P4.

Figure 4:
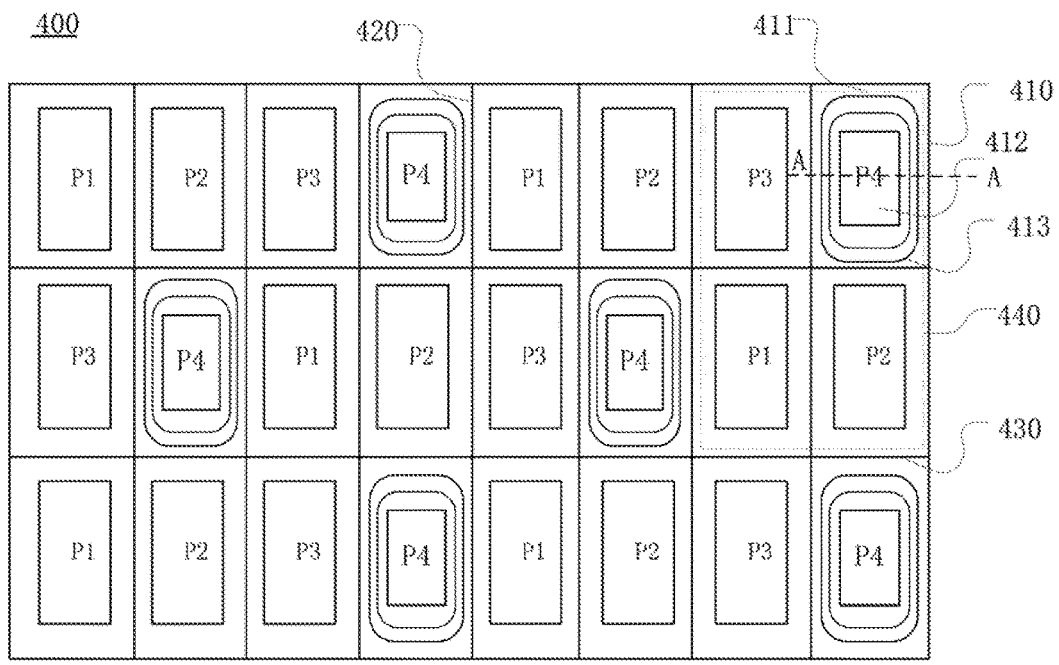
FIG. 4 illustrates a schematic view of another exemplary array substrate according to embodiments of the present disclosure.

FIG. 4 illustrates a schematic view of another exemplary array, substrate according to embodiments of the present disclosure. As shown in FIG. 4, an array substrate 400 may have a structure similar to the array substrate 200 illustrated in FIG. 2. That is, the array substrate 400 may include a plurality of sub-pixels 410 defined by a plurality of scanning lines 430 and a plurality of data lines 420. The plurality of sub-pixels 410 may be arranged in a matrix of rows and columns and further include the first sub-pixels P1, the second sub-pixels P2, the third sub-pixels P3, and the fourth sub-pixels P4 configured to display different colors. Each sub-pixel 410 may include an aperture region 412 and a non-aperture region 411.

Specifically, a pixel group 440 is used as an example for illustrative purposes. The pixel group 440 may include one first sub-pixel P1, one second sub-pixel P2, one third sub-pixel P3, and one fourth sub-pixel P4. In the pixel group 440, sub-pixels may be arranged in a manner that displays a rectangular shape, as indicated by the dashed line shown in FIG. 4. Further, the pixel group 440 may include one display unit 413 disposed in the non-aperture region 411 of the fourth sub-pixel P4. The display unit 413 may be, for example, a support column (also called photo spacer, spacer, etc.).

In one embodiment, the support columns 413 may be made of a colorless and transparent material. Thus, the support columns 413 may be disposed in the fourth sub-pixels P4 without affecting the light transmittance.

In one embodiment, as shown in FIG. 4, instead of occupying tire aperture regions 412 of the first sub-pixel P1, the second sub-pixel P2, and the third sub-pixel P3, the support columns 413 may be disposed in the non-aperture regions 411 of the fourth sub-pixels P4. That is, no support column may be disposed in the first sub-pixels P1, the second sub-pixels P2, and the third sub-pixels P3. Accordingly, the light transmittance of the array substrate 400 may be further improved.

In one embodiment, as shown, in FIG. 4, the support column 413 may be disposed corresponding to the non-aperture region 411 of each fourth sub-pixel P4. That is, one support column 413 may be associated with the fourth sub-pixel P4 where the one support column 413 is disposed. More specifically, the one support column 413 may be disposed in the non-aperture region 411 of the fourth sub-pixel P4, and surround the aperture region 412 of the fourth sub-pixel P4.

Further, in a plane parallel to the surface of the array substrate 400, the cross-sectional shape of the support column 413 may be a rectangular frame with four rounded inside corners and four rounded outside corners. Optionally, the cross-sectional shape of the support column 413 may have other regular (i.e., circular ring) or irregular shapes, depending on specific situations.

FIG. 4 only illustrates pixel groups where sub-pixels, are arranged in a rectangular shape, and the present disclosure is not limited thereto. Those skilled in the art may also arrange the sub-pixels into a "T" shape, etc., which is not repeatedly described herein.

Further, as shown in FIG. 4, instead of occupying the aperture regions 412 of the first sub-pixel P1, the second sub-pixel P2, and the third sub-pixel P3, the support column 413 in the pixel group 440 may be disposed in the non-aperture region 411 of the fourth sub-pixel P4. Accordingly, the area of the aperture region 412 of the sub-pixels other than the fourth sub-pixels P4 may be increased, thereby increasing the aperture ratio of the sub-pixels other than the fourth sub-pixels P4.

Further, different from using the thin film transistors as the display units in FIG. 3, FIG. 4 illustrates the usage of the support columns as the display units, thereby ensuring the consistency of the storage capacitance of the sub-pixels.

Figure 5A:
FIGS. 5A-5F illustrate cross-sectional views of a fourth sub-pixel in an exemplary array substrate according to embodiments of the present disclosure.

FIGS. 5A-5F illustrate A-A cross-sectional views of a fourth sub-pixel in an exemplary array substrate in FIG. 4 according to embodiments of the present disclosure. In one embodiment, as shown in FIG. 5A, a black matrix 511 is disposed above the non-aperture region 411 of the fourth sub-pixel P4. Other film layers 512 of the array substrate may be disposed below the black matrix 511. A support column 413 may be disposed above the black matrix 511. In one embodiment, as illustrated in FIG. 5A, the perpendicular projection area, of the support column 413 onto the film layers 512 is smaller than the perpendicular projection area of the black matrix 511 onto the other film layers 512.

Figure 5B:
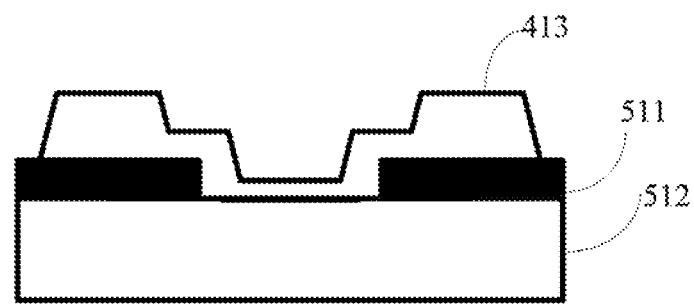

Different from FIG. 5A, in another embodiment, as shown in FIG. 5B, other than being disposed above the black matrix 511, a part of the support column 413 is also disposed above the other film layers 512. In particular, the perpendicular projection area of the support columns 413 onto the other film layers 512 is greater than the perpendicular projection area of the black matrix 511 onto the other film layers 512.

Figure 5C:
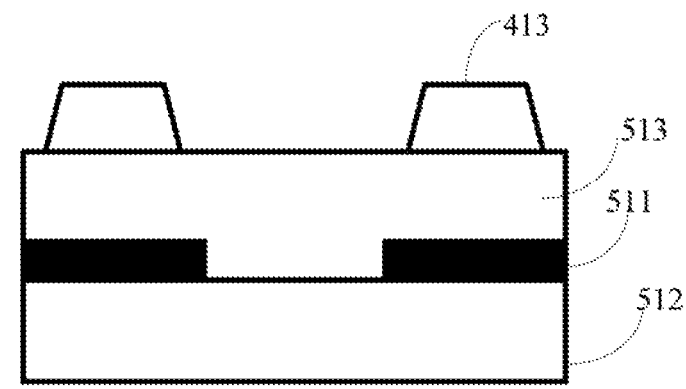

In another embodiment, as shown in FIG. 5C, the array substrate 400 further includes an organic insulating layer 513 disposed between the support column 413 and the black matrix 511. In particular, insulated from each other by the organic insulating layer 513, the support column 413 and the black matrix 511 may not be in direct contact. Further, as shown in FIG. 5C, the perpendicular projection area of the support column 413 onto the other film layers 512 is smaller than the perpendicular projection area of the black matrix 511 onto the other film layers 512.

Figure 5D:
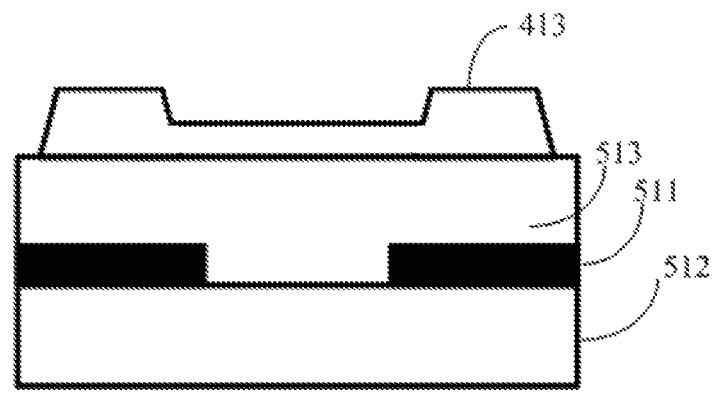

Different from FIG. 5C, in another embodiment, as shown in FIG. 5D, other than being disposed above die black matrix 511, a part of the support columns 413 may also be disposed on the organic insulating layer 513. In particular, the perpendicular projection area of the support column 413 onto the other film layers 512 is greater than the perpendicular projection area of the black matrix 511 onto the other film layers 512.

Figure 5E:
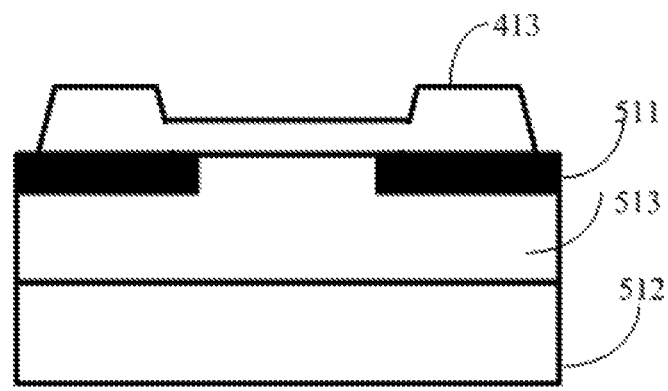

Different form FIG. 5D, in another embodiment, as shown, in FIG. 5E, the organic insulating layer 513 is disposed on the other film, layers 512, and the support column 413 is disposed on the black matrix 511 and the organic insulating layer 513. That is, the black matrix 511 is in direct contact with the support column 413.

Figure 5F:
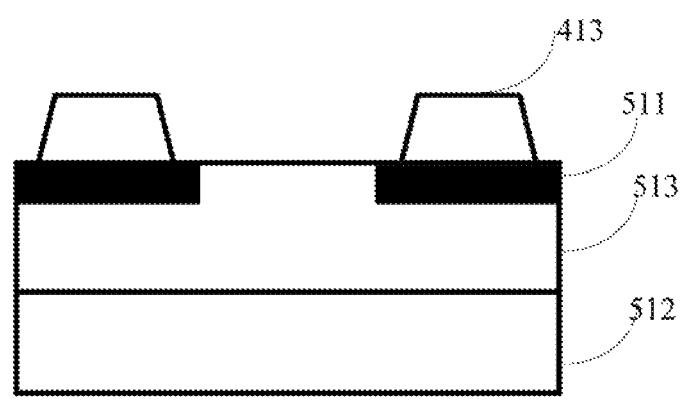

Different from FIG. 5E where a part of the support column 413 is also disposed above the organic insulating layer 513, in another embodiment, as shown in FIG. 5F, the support column 413 is only disposed above the black matrix 511. However, the present disclosure is not limited to embodiments illustrated in FIG. 5A-FIG. 5F.

Figure 6:
FIG. 6 illustrates a cross-sectional view of an exemplary array substrate according to embodiments of the present disclosure.

FIG. 6 illustrates a cross-sectional view of an exemplary array substrate according to embodiments of the present disclosure. As shown in FIG. 6, a stacked structure of an array substrate 600 is illustrated. For ease of clarification. FIG. 6 only illustrates a position relationship of each layer of the array substrate 600 in a profile direction, and may not show one-to-one correspondence with the position relationship of the array substrate 400 in a plane where the array substrate 400 is located, as illustrated in FIG. 4.

More, specifically, as shown in FIG. 6, the array substrate 600 includes a substrate 610, a thin film transistor driving layer 620 disposed, on the substrate 610, a color filter layer 630 disposed on the thin film transistor driving layer 620, and a liquid crystal driving layer 640 disposed on the color filter layer 630. The color filter layer 630 may include a plurality of color blockers in a plurality of colors. The thin film transistor driving layer 620 may include a basic film layer including active devices, such as gate lines, data lines, and thin film transistors, etc. The function of the thin film transistor driving layer 620 may be to control the working status of each sub-pixel.

In another embodiment, the color filter layer 630 may further include an organic film or a passivation layer. In particular, the organic film or the passivation layer may be located at one side of the color filter lacing away the substrate 610. Optionally, the substrate 610 may be a glass substrate or a quartz substrate.

In another embodiment, the thin film transistor driving layer 620 and the color filter layer 630 may be disposed on the same substrate 610. Because the alignment accuracy between the thin film transistors and the color filter layer 630 is high, the thinning of the black matrix on the color filter layer 630 may become possible, such that the array substrate 600 may obtain a higher aperture ratio.

The present disclosure is not intended to limit the specific type of the array substrate. For example, the array substrate may be a top-gate array substrate, or a bottom-gate array substrate, and the specific type of the array substrate may be determined according to practical applications. Hereinafter, embodiments are illustrated using the bottom-gate array substrate as the array substrate 600.

Figure 7:
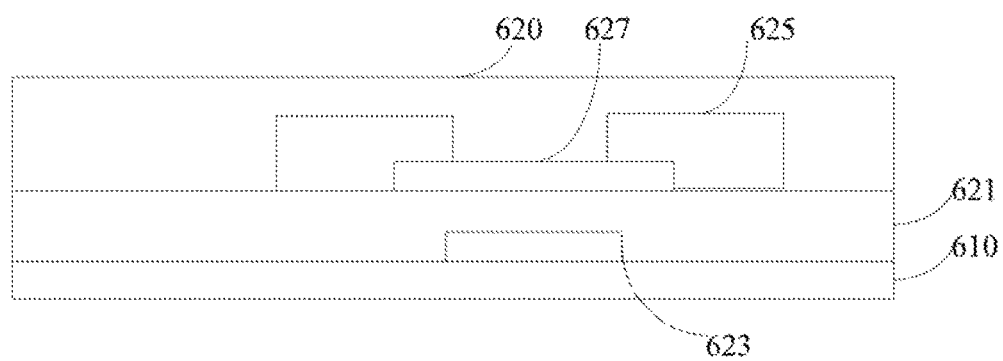
FIG. 7 illustrates a cross-sectional view of a thin film transistor driving layer according to embodiments of the present disclosure.

FIG. 7 illustrates a cross-sectional view of a thin film transistor driving layer according to embodiments of the present disclosure. As shown in FIG. 7, the thin film transistor driving layer 620 may be disposed on the substrate 610, and include at least a first conductive layer 625, a second conductive layer 623, a semiconductor layer 627, and a first insulating layer 621. Further, a plurality of active regions may be disposed in the semiconductor layer 627.

More specifically, the semiconductor layer 627 may remain insulated with at least one of the first conductive layer 625 and the second conductive layer 623 via the first insulating layer 621. Further, the semiconductor layer 627 may be partially overlapped with at least one of the first conductive layer 625 and the second conductive layer 623.

For example, in one embodiment, as illustrated in FIG. 7, the semiconductor layer 627 and the second conductive layer 623 are not in direct contact, but are insulated from each other via the first insulating layer 621. Further, the semiconductor layer 627 and the first conductive layer 625 are at least partially overlapped.

In one embodiment, the thickness of the first conductive layer 625 and the thickness of the second conductive layer 623 may be different. Different thickness may form different resistances of the resistors, such that an effect of saving materials may be achieved.

In one embodiment, the first conductive layer 625 and the second conductive layer 623 may be made of metals. In one embodiment, the semiconductor layer 627 may be made of amorphous silicon, low-temperature polycrystalline silicon, metal oxide, or low-temperature polycrystalline oxide, etc. In one embodiment, the first insulating layer 621 may be made of silicon nitride, silicon oxide, or other oxynitrides suitable to form an insulating layer.

In one embodiment, the wire formed on the first conductive layer 625 may not be parallel to the wire formed on the second conductive layer 623. In another embodiment, at least a part of the wire formed on the first conductive layer 625 is perpendicular to the wire formed on the second conductive layer 623. Further, in one embodiment, at least one of the first conductive layer 625 and the second conductive layer 623 includes aluminum or copper.

Figure 8:
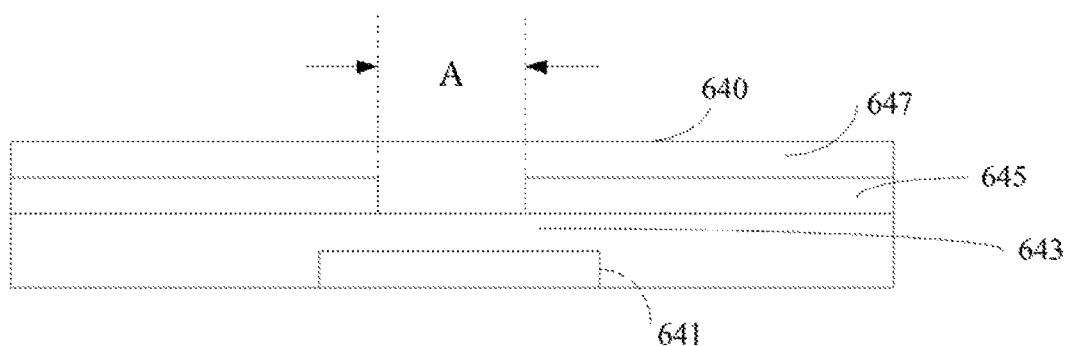
FIG. 8 illustrates a cross-sectional view of a liquid crystal driving layer according to embodiments of the present disclosure.

FIG. 8 illustrates a cross-sectional view of a liquid crystal driving layer according to embodiments of the present disclosure. As shown in FIG. 8, the liquid crystal driving layer 640 may include a first transparent conductive layer 641, a second insulating layer 643, and a second transparent conductive layer 645. The liquid crystal driving layer 640 may further include a insulating protection layer 647. The function of the liquid crystal layer 640 may be to control liquid crystals in pixel cells.

In particular, the second insulating layer 643 may be disposed between the first transparent conductive layer 641 and the second transparent conductive layer 645. Further, the insulating protection layer 647 may be disposed on a transparent conductive layer including a plurality of stripe-shaped electrodes. For example, as shown in FIG. 8, the insulating protection layer 647 may be disposed on the second transparent conductive layer 645 and have a function that avoids scratches.

In one embodiment, the thickness of the first transparent conductive layer 641 is different from the thickness of the second transparent conductive layer 645. Different thickness may form different resistances, thereby achieving an effect of saving materials.

In one embodiment, the thickness of the second insulating layer 643 may be greater than the thickness of the first transparent conductive layer 641 and the second transparent conductive layer 645.

In one embodiment, the material of the first transparent conductive layer 641 is the same as the material of the second transparent conductive layer 645. In one embodiment, one of the first transparent conductive layer 641 and the second transparent conductive layer 645 may be a common electrode, and the other may be a pixel electrode.

In other embodiments of the present disclosure, the common electrode and the pixel electrode may be fabricated using a transparent and conductive metal oxide, such as indium tin oxide (ITO). The second insulating layer 643 may be fabricated using a material such as silicon oxide, silicon nitride, or silicon oxynitride, etc. The relative positions of the aforementioned layers may be adjusted, which is not repeatedly described herein.

In one embodiment, at least one of the first transparent conductive layer 641 and the second transparent conductive layer 645 includes a plurality of stripe-shaped electrodes. In particular, two adjacent, stripe-shaped electrodes in one of first transparent conductive layer 641 and the second transparent conductive layer 645 that comprises the plurality of stripe-shaped electrodes may overlap with the other transparent conductive layer.

Further, referring to FIG. 8, the liquid crystal driving layer 640 may be cut along a certain direction. Viewed from the fracture surface, the second transparent conductive layer 645 may be discontinuous. In a plurality of discontinuous intervals, at least one interval (e.g., interval A) may overlap the first transparent conductive layer 641. In particular, the second transparent conductive layer 645 including the plurality of discontinuous intervals may be located on one side of the first transparent conductive layer 641 facing away the substrate 610.

In particular, along the light transmittance direction of the array substrate 600, the pixel electrode may be located above the common electrode, or the common electrode may be located above the pixel electrode, or the common electrode and the pixel electrode may be disposed on the same layer. Further, the pixel electrode and the common electrode are mutually insulated. The present disclosure is not intended to limit the positions of the common electrode and the pixel electrode.

FIGS. 9A-9E illustrate top views of a color filter layer according to embodiments of the present disclosure. In particular, at least two of a plurality of color blockers on a color filter layer are overlapped to form an overlapping portion. That is, the overlapping portion may be formed by two color blockers in different colors overlapping with each other, or three color blockers in different colors overlapping with each other. In particular, the overlapping portion is at least partially disposed above the non-aperture region of the first sub-pixel P1, the second sub-pixel P2, the third sub-pixel P3, and the fourth sub-pixel P4.

In one embodiment, as shown in FIGS. 9A-9E, the plurality of color blockers on the color filter layer may include red color blockers (R), green color blockers (G), blue color blockers (B), and white color blockers (W). In particular, the red color blockers (R), the green color blockers (G), and the blue (B) color blockers may function to render the white light emitted from a backlight, with red, green, and blue colors.

Further, the light transmittance portion (regions other than the color blocker overlapping portion) of the red color blockers may be correspondingly disposed above the aperture region of the first sob-pixels P1, and the light transmittance portion of the green color blockers may be correspondingly disposed above the aperture region of the second sub-pixels P2. Simultaneously, the light transmittance portion of the blue color blockers may be correspondingly disposed above the aperture region of the third sub-pixels P3, and the light transmittance of the white color blockers may be correspondingly disposed above the aperture region of the fourth sub-pixels P4. The light transmittance portions of different color blockers may respectively correspond to different rectangular patterns with a white background (shown in FIGS. 9A-9E).

In some embodiments, the color blockers may include the following tour colors: red, green, blue, and yellow. In some other embodiments, the color blockers may include the following four colors: red, green, blue, and magenta. The present disclosure is not intended to limit the colors included in the color blockers, and the overlapping portions between different color blockers is also not limited.

In some embodiments, the red color filter and the green color filter, the green color filter and the blue color filter, the blue color filter and the red color filter may be overlapped to form overlapping portions. Because partial overlapping exists in the color blockers, and the overlapping portions hardly allow the traverse of the light, the overlapping portions of the color blockers may partially replace the black matrix.

In one embodiment, the thickness of the red color filter, the thickness of the green color filter, and the thickness of the blue color filter may be different. Because the transmittance of light of different colors is different, the thicknesses of the red, green, and blue color blockers may be configured to be different to further improve the display effects.

In some embodiments, the black matrix is disposed above at least a part of the non-aperture region of the fourth sub-pixel P4. In some other embodiments, the black matrix may not overlap with the overlapping portions of the color blockers. That is, assuming a part of the non-aperture region of the fourth sub-pixel P4 is sheltered using the black matrix and another part is partially sheltered using the overlapping portions between the color blockers, no color filter overlapping portion is included above the non-aperture region of the black matrix. Similarly, no black matrix may be included above the non-aperture region sheltered using the overlapping portions between color blockers.

In one embodiment, the pitch between two adjacent color blockers of the same color may be approximately three time or four times the pitch between two adjacent sub-pixels regions. Further, the material of the black matrix may specifically be an organic material, or an inorganic material, such as an inorganic black material comprising Cr. The processing method may specifically be a dyeing method, a pigment dispersion method, a printing method, or an electrodeposition method.

Figure 9A:
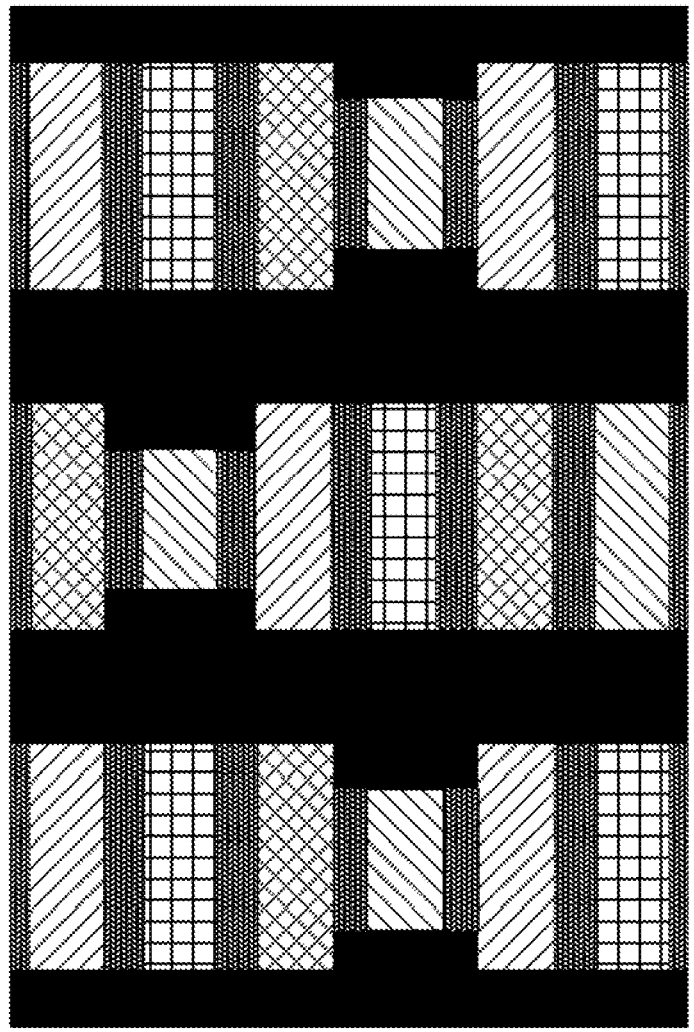
FIGS. 9A-9E illustrate top views of a color filter layer according to embodiments of the present disclosure.

Referring to FIG. 9A, overlapping portions between color blockers may be used to partially shelter light for adjacent non-aperture regions (represented by the rectangular patterns with a black background) of sub-pixels (e.g., P1-P4) along the row direction. Further, the black matrices may be used to shelter light for adjacent non-aperture regions (represented by a black color) of sub-pixels along the column direction.

Figure 9B:
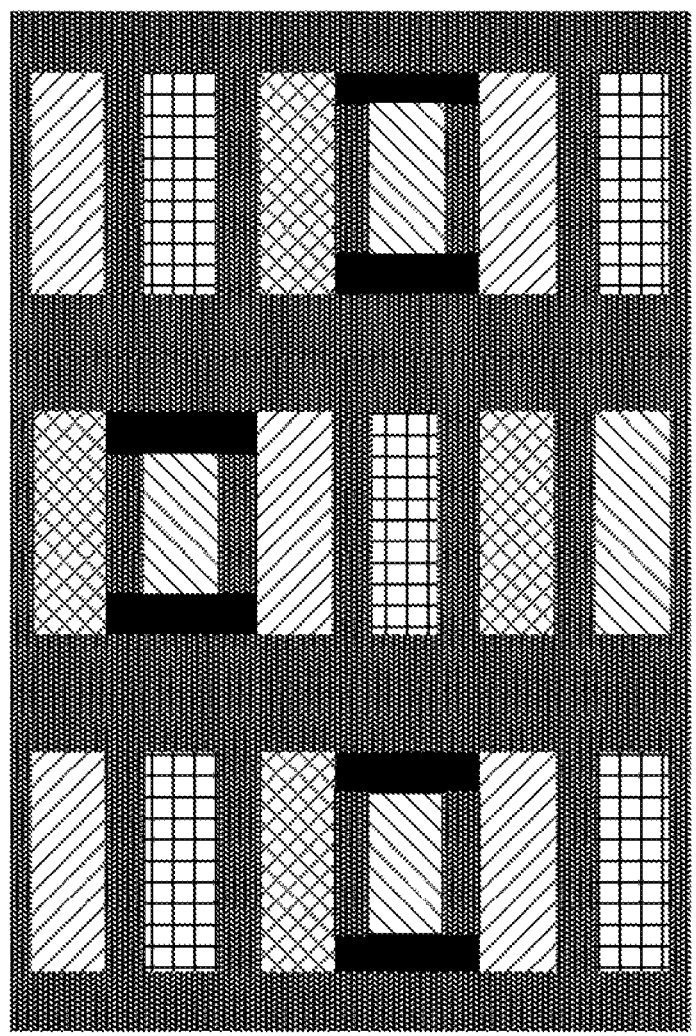

Different from FIG. 9A, as shown in FIG. 9B, the overlapping portions between color blockers may also be used to partially shelter light for adjacent non-aperture regions (represented by the rectangular patterns with a black background) of sub-pixels (P1-P4) along the column direction. Further, black matrices may be only used to shelter light for each fourth sub-pixel P4, that is, two rectangular black matrices (represented by the black color) with one above and one below the aperture region of each fourth sub-pixel P4 may be used for light-sheltering.

Figure 9C:
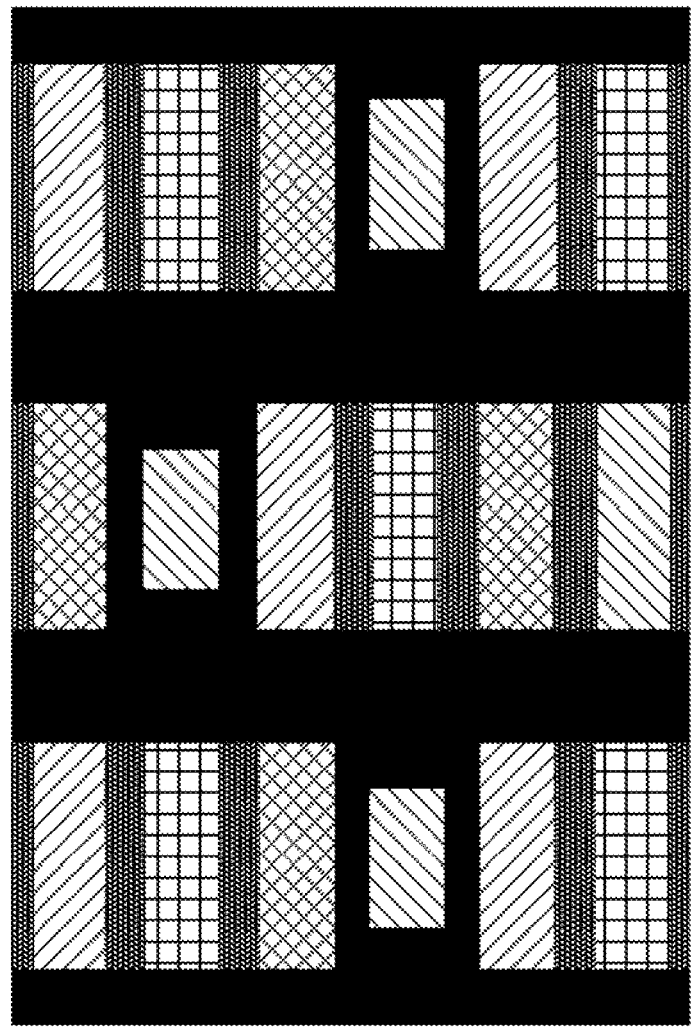

Different from FIG. 9A, as shown, in FIG. 9C, black matrices (represented by the black color) may be used to shelter light for the non-aperture regions of each fourth sub-pixel P4 along the row direction and the non-aperture regions of the first, second, and third sub-pixels adjacent to the fourth sub-pixels.

Figure 9D:
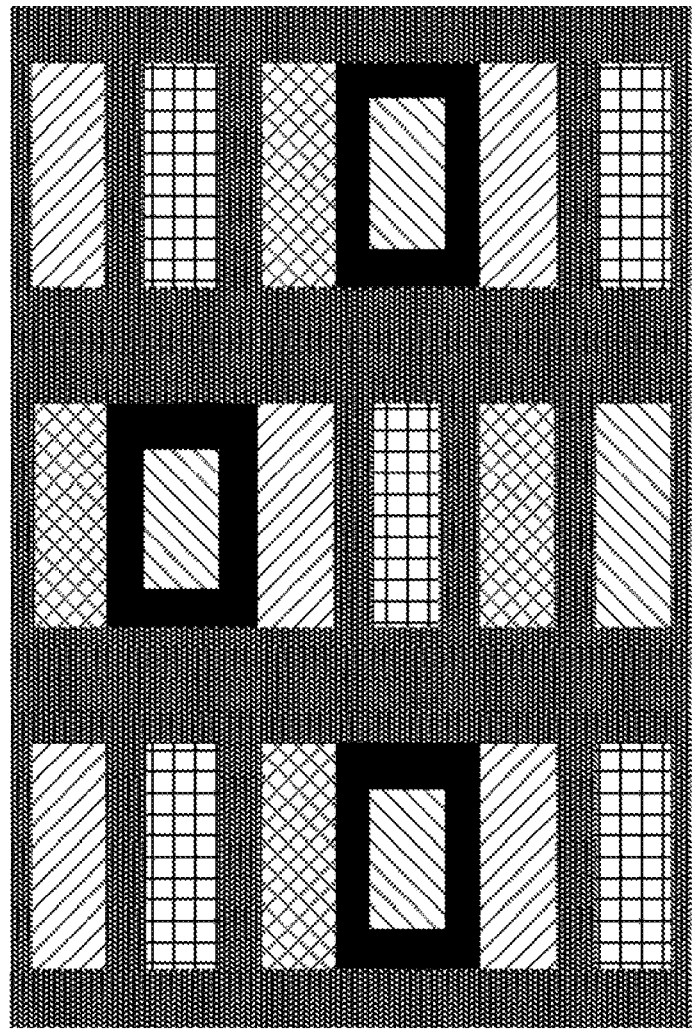

Different from FIG. 9C, as shown in FIG. 9D, overlapping portions between color blockers may also be used to partially shelter light for adjacent non-aperture regions (represented by rectangular patterns with a black background) of the sub-pixels along the column direction. Further, black matrices may be only used to shelter light for each fourth sub-pixel P4, that is, four rectangular black matrices (represented by the black color) each above, blow, to the left of and to the right of the aperture-region of each fourth sub-pixel P4 may be used for light sheltering.

Figure 9E:
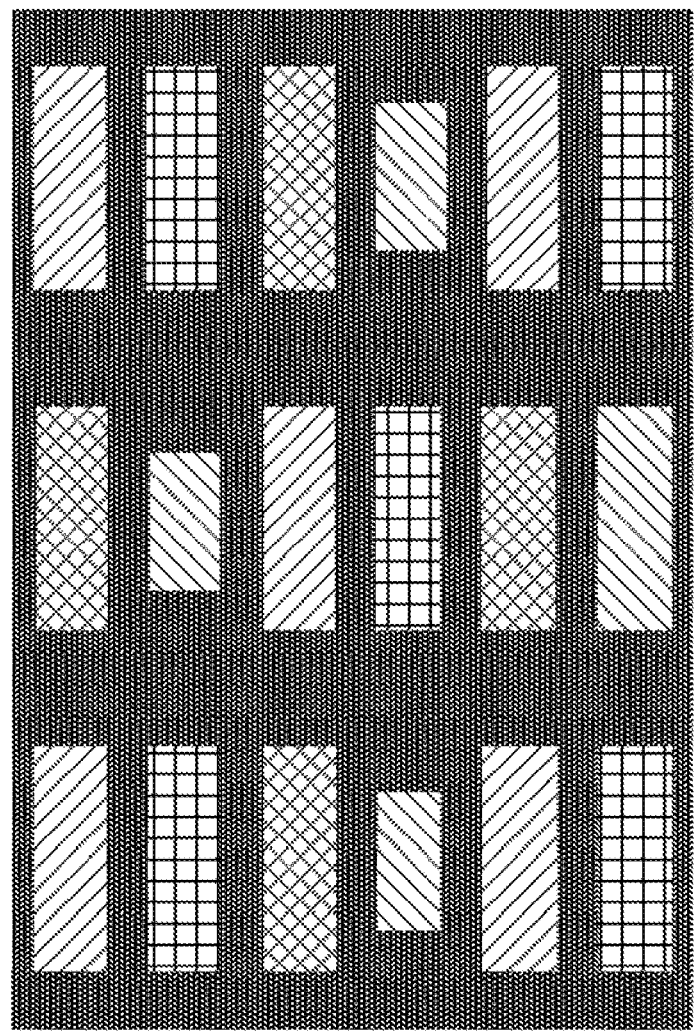
Figure 9E:
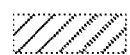
Figure 9E:
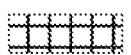
Figure 9E:
Figure 9E:

Referring to FIG. 9E, different from FIG. 9A-FIG. 9D, overlapping portions between color blockers may be used to partially shelter light for the non-aperture regions of all sub-pixels (i.e., sub-pixels P1, P2, P3, and P4), such that the fabrication of the black matrix (BM) is no longer needed. Accordingly, the BM process may be simplified, thereby improving the production efficiency.

The color filter layers described in FIGS. 9A-9B are examples for illustrative purposes, and any combination of the black matrices and overlapping portions between the color blockers may be configured above the non-aperture regions of the first, second, third, and the fourth sub-pixels, and the present disclosure is not limited thereto.

The above-described accompanying drawings only exemplarily illustrate schematic views of an array substrate and a part of components provided by embodiments of the present disclosure. For ease of clarification, some of the components are omitted, and each film layer is simplified. Those skilled in the art may implement more variations according to the descriptions disclosed herein. For example, a part of components may be added, or the shapes of some components may be altered. Without departing from the spirit of the present disclosure, the variations all fall within the protection scope of the present disclosure, which is not repeatedly described herein.

Figure 10:
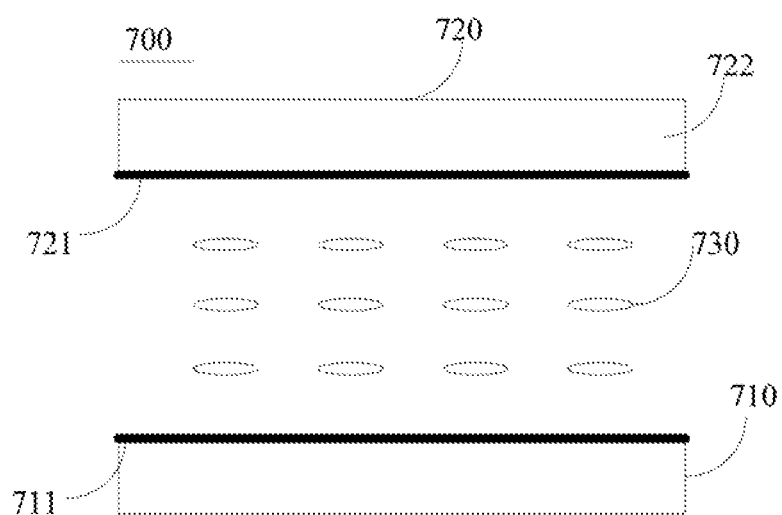
FIG. 10 illustrates a schematic view of a display panel according to embodiments of the present disclosure.

The present disclosure further provides a display panel including the aforementioned array substrate. FIG. 10 illustrates a schematic view of a display panel according to embodiments of the present disclosure. As shown in FIG. 10, a display panel 700 may include an array substrate 710, a counter substrate 720 arranged opposite to the array substrate 710, and a liquid crystal layer 730 sandwiched between the array substrate 710 and the counter substrate 720.

In one embodiment, the counter substrate 720 may include a first alignment film 721, and a transparent substrate 722. In one embodiment, the array substrate 710 may include a second alignment film 711.

Further, in some embodiments, the array substrate 10 and the counter substrate 720 may be sealed using a sealant, and the sealant may be applied on edges of the array substrate 710 and the counter substrate 720. Further, support columns may be disposed on surface of the counter substrate 720 facing towards the array substrate 710. The support columns may be configured to support and maintain the height of the accommodating space enclosed by the array substrate 710, the counter substrate 720, and the sealant. Accordingly, the thickness of the liquid crystal layer 730 may be ensured to be relatively constant, and the consistency of the optical path is ensured during the display process.

Optionally, the display panel may be integrated with a processes thereby controlling and processing the images displayed on the display panel 700, which is not repeatedly described here.

The display panel may be a liquid crystal display panel. In other disclosed exemplary embodiments, the display panel may also be a polymer light-emitting diode (FLED) display panel, a plasma display panel (PDP), or other flat-panel display panels. That is, the disclosed embodiments are not tended to be limiting. Further, specific embodiments of the array substrate are described in detail with reference to the aforementioned embodiments, and are not repeatedly described herein.

In the disclosed array substrate and display panel, on one hand, the number of the sub-pixels may be increased by changing the aperture ratio of the sub-pixels, thereby improving the smoothing degree of the display effect. On the other hand, by configuring the area of the aperture region, of the fourth sub-pixel to be smaller than the area of the aperture region of any other sub-pixels, the issue of excessive brightness when the fourth sub-pixels emit light may be alleviated.

Further, by combining and integrating the color filter layer onto the array substrate, the light transmittance of the display panel may be improved, thereby preventing the black matrix from sheltering the aperture region. Further, the present disclosure may further increase the areas of the aperture regions of the first sub-pixels, the second sub-pixels, and the third sub-pixels by configuring the display units in the non-aperture region of the fourth sub-pixels. Accordingly, the image brightness of the color of the first (second or third) sub-pixels may be enhanced.

Further, the present disclosure may also use the overlapping portions between the color blockers to at least partially replace the black matrix, thereby further improving the display effect. Further, a ring-shaped support column may only be disposed in the non-aperture region of each fourth sub-pixel, thereby further improving the light transmittance.

The present disclosure has been described with reference to the aforementioned related embodiments, however, the aforementioned embodiments are merely preferred embodiments disclosed herein. It should be noted that the disclosed embodiments are not intended to limit the scope of the present disclosure. In contrast, alterations and modifications made without departing from the spirit and scope of the present disclosure all fall within the protection scope of the present disclosure.

What is claimed is:

1. An array substrate, comprising:
a plurality of sub-pixels defined by a plurality of scanning lines and a plurality of data lines, the plurality of sub-pixels being arranged in a matrix and including first sub-pixels, second sub-pixels, third sub-pixels, and fourth sub-pixels configured to display different colors; and
a color filter layer including a plurality of color blockers in a plurality of colors,
wherein the first sub-pixels, the second sub-pixels, the third sub-pixels, and the fourth sub-pixels each includes an aperture region and a non-aperture region,
a length-to-width aspect ratio of one of the plurality of sub-pixels is greater than approximately 2:1, and
an aperture region of the fourth sub-pixel is smaller than an aperture region of any one of the first sub-pixel, the second sub-pixel, and the third sub-pixel,
wherein the plurality of sub-pixels forms a plurality of pixel groups,
each pixel group includes at least one display unit and four sub-pixels including one fourth sub-pixel,
the at least one display unit is located at the non-aperture region of the one fourth sub-pixel,
the at least one display unit is a support column disposed completely surrounding the aperture region of the fourth sub-pixel, and
the support column is disposed in the non-aperture region of the one fourth sub-pixel.

2. The array substrate according to claim 1, wherein:
the plurality of color blockers include red color blockers, green color blockers, and blue color blockers, and
the red color blockers, the green color blockers, and the blue color blockers have different thicknesses.

3. The array substrate according to claim 2, wherein:
a pitch between two adjacent color blockers in a same color is approximately four times a pitch between two adjacent sub-pixels.

4. The array substrate according to claim 1, wherein:
at least two of the plurality of color blockers are overlapped to form an overlapping portion, and
the overlapping portion is at least partially disposed above the non-aperture region of the first sub-pixel, the second sub-pixel, the third sub-pixel, and the fourth sub-pixel.

5. The array substrate according to claim 4, wherein:
a black matrix is at least partially disposed above the non-aperture region of the fourth sub-pixel, and
the black matrix is not overlapped with the overlapping portion.

6. The array substrate according to claim 1, further comprising:
an organic insulating layer disposed between the support column and the black matrix,
wherein the black matrix is disposed above the non-aperture region of the fourth sub-pixel.

7. The array substrate according to claim 1, wherein:
the support column is made of a colorless and transparent material.

8. The array substrate according to claim 1, wherein:
the first sub-pixels, the second sub-pixels, and the third sub-pixels are respectively red sub-pixels, green sub-pixels, and blue sub-pixels different from each other.

9. The array substrate according to claim 8, wherein:
the fourth sub-pixel is any one of a white sub-pixel, a yellow sub-pixel, and a green sub-pixel.

10. The array substrate according to claim 1, further comprising:
a substrate; and
a thin film transistor driving layer sandwiched between the substrate and the color filter layer, the thin film transistor driving layer further comprising:
a first conductive layer,
a second conductive layer,
a semiconductor layer, and
a first insulating layer;
wherein the semiconductor layer is insulated from at least one of the first conductive layer and the second conductive layer via the first insulating layer, and the semiconductor layer is at least partially overlapped with the first conductive layer and the second conductive layer.

11. The array substrate according to claim 10, wherein:
the first conductive layer and the second conductive layer have different thicknesses.

12. The array substrate according to claim 10, further comprising a liquid crystal driving layer disposed on the color filter layer, wherein the liquid crystal driving layer comprises:
a first transparent conductive layer,
a second transparent conductive layer, and
a second insulating layer sandwiched between the first transparent conductive layer and the second transparent conductive layer.

13. The array substrate according to claim 12, wherein:
the first transparent conductive layer and the second transparent conductive layer have different thicknesses.

14. The array substrate according to claim 12, wherein:
at least one of the first transparent conductive layer and the second transparent conductive layer includes a plurality of stripe-shaped electrodes, and
two adjacent stripe-shaped electrodes in one of the first transparent conductive layer and the second transparent conductive layer that includes the plurality of stripe-shaped electrodes overlap with the other one of the first transparent conductive layer and the second transparent conductive layer.

15. The array substrate according to claim 14, further comprising:
an insulating protection layer disposed above the transparent conductive layer including the plurality of stripe-shaped electrodes.

16. The array substrate according to claim 1, further including:
a black matrix disposed above the non-aperture region of the fourth sub-pixel; and
a film layer disposed below the black matrix,
wherein the support column is disposed on both the black matrix and the film layer, and
a perpendicular projection of the support column onto the film layer is greater than the perpendicular projection area of the black matrix onto the film layer.

17. A display panel, comprising:
an array substrate including a plurality of sub-pixels defined by a plurality of scanning lines and a plurality of data lines and a color filter layer includes a plurality of color blockers in a plurality of colors;
a counter substrate arranged opposite to the array substrate; and
a liquid crystal layer sandwiched between the array substrate and the counter substrate,
wherein the plurality of sub-pixels is arranged in a matrix and includes first sub-pixels, second sub-pixels, third sub-pixels, and fourth sub-pixels configured to display different colors,
the first sub-pixels, the second sub-pixels, the third sub-pixels, and the fourth sub-pixels each includes an aperture region and a non-aperture region,
a length-to-width ratio of one of the plurality of sub-pixels is greater than 2:1, and
an aperture region of the fourth sub-pixel is smaller than an aperture region of any one of the first sub-pixel, the second sub-pixel, and the third sub-pixel,
wherein the plurality of sub-pixels forms a plurality of pixel groups,
each pixel group includes at least one display unit and four sub-pixels including one fourth sub-pixel,
the at least one display unit is located at the non-aperture region of the one fourth sub-pixel,
the at least one display unit is a support column disposed completely surrounding the aperture region of the fourth sub-pixel, and
the support column is disposed in the non-aperture region of the one fourth sub-pixel.

18. The display panel according to claim 17, wherein the counter substrate includes a first alignment film and a transparent substrate.

19. The display panel according to claim 17, wherein the array substrate includes a second alignment film.

20. An array substrate, comprising:
a plurality of sub-pixels defined by a plurality of scanning lines and a plurality of data lines, the plurality of sub-pixels being arranged in a matrix and including first sub-pixels, second sub-pixels, third sub-pixels, and fourth sub-pixels configured to display different colors;
a color filter layer including a plurality of color blockers in a plurality of colors;
a black matrix disposed above the non-aperture region of the fourth sub-pixel; and
a film layer disposed below the black matrix,
wherein the first sub-pixels, the second sub-pixels, the third sub-pixels, and the fourth sub-pixels each includes an aperture region and a non-aperture region,
a length-to-width aspect ratio of one of the plurality of sub-pixels is greater than approximately 2:1, and
an aperture region of the fourth sub-pixel is smaller than an aperture region of any one of the first sub-pixel, the second sub-pixel, and the third sub-pixel,
wherein the plurality of sub-pixels forms a plurality of pixel groups,
each pixel group includes at least one display unit and four sub-pixels including one fourth sub-pixel,
the at least one display unit is a support column located at the non-aperture region of the one fourth sub-pixel,
wherein the support column is disposed on both the black matrix and the film layer, and
a perpendicular projection of the support column onto the film layer is greater than the perpendicular projection area of the black matrix onto the film layer.

* * * * *